United States Patent [19]

Mizokami

[11] 4,444,481
[45] Apr. 24, 1984

[54] EXPOSURE CONTROL CIRCUIT FOR A CAMERA

[75] Inventor: Kazunori Mizokami, Hachioji, Japan

[73] Assignee: Olympus Optical Company Ltd., Japan

[21] Appl. No.: 328,001

[22] Filed: Dec. 7, 1981

[30] Foreign Application Priority Data

Dec. 26, 1980 [JP] Japan ............... 55-190675[U]
Mar. 6, 1981 [JP] Japan ............... 56-031282[U]

[51] Int. Cl.³ .................................................. G03B 7/08
[52] U.S. Cl. ...................................... 354/401; 354/464
[58] Field of Search ................. 354/28, 37, 41, 51, 354/60 R, 58

[56] References Cited

U.S. PATENT DOCUMENTS 4,189,221 2/1980 Kawasaki ............................ 354/58
4,343,541 10/1982 Mizokami .......................... 354/60 R
4,363,541 12/1982 Aihara et al. ......................... 354/51

FOREIGN PATENT DOCUMENTS

51-75439 of 1976 Japan .
53-107828 of 1978 Japan .

Primary Examiner—Russell E. Adams
Attorney, Agent, or Firm—Ostrolenk, Faber, Gerb & Soffen

[57] ABSTRACT

An exposure control circuit for camera comprises an integrating circuit including a plurality of capacitors for integrating a photocurrent which depends on the brightness of an object being photographed. The integrated voltage is compared against a decision voltage which depends on a particular value of film speed. The level of the decision voltage is switched either manually or automatically for low and high values of film speed as the combined capacitance of the integrating capacitors is switched.

5 Claims, 6 Drawing Figures

EXPOSURE CONTROL CIRCUIT FOR A CAMERA

BACKGROUND OF THE INVENTION

The invention relates to an exposure control circuit for a camera, and more particularly, to an exposure control circuit for use in a camera of TTL direct photometry type in which a photocurrent from a photoelectric transducer element, which is provided for purpose of photometry, is directly integrated to provide an integrated output, the level of which is determined relative to a preset value which is based on film speed information in order to control the exposure process.

Recently, a single lens reflex camera of so-called TTL direct photometry type has been used in which light from an object being photographed passing through a taking lens and reflected by a film surface or a first shutter blind surface immediately before the film surface becomes exposed is measured, thereby allowing an exposure period to be controlled in accordance with such photometric output. In a camera of the kind described, a movable mirror associated with a finder moves upward in response to a shutter release operation, allowing a first shutter blind to begin running. Simultaneously, photometry of light from an object being photographed is initiated by a photoelectric transducer element, which produces a photocurrent in accordance with the magnitude of the brightness of the object, thereby integrating an integrating capacitor. When a voltage across the integrating capacitor reaches a given value, a second shutter blind is released to begin running, thus terminating an exposure operation.

It will be understood that a voltage against which the integrated voltage across the capacitor should be compared to determine its level must be changed in accordance with film speed. Specifically, the film speed changes in a geometrical series of 3, 6, 12, 25, 50, 100 . . . 6400 in ASA values, so that if a range of film speeds from 3 to 6400, for example, is to be covered, the voltage which is used for the level decision of the integrated voltage must be changed in a corresponding manner. However, if the voltage utilized for such level decision is allowed to vary to correspond to the range of film speeds utilized, a great difference in the magnitude of decision voltages which correspond to the maximum and the minimum value of film speeds is required. In addition, a change in the decision voltage which can be chosen for one step change of the film speed is limited in magnitude, so that an exposure control circuit is susceptible to drift voltage or noises, preventing an accurate exposure period from being determined.

To accommodate for this difficulty, there is provided in Japanese Laid-Open Patent Application No. 107,828/1978 an exposure control circuit including a pair of integrating capacitors which are switched into and out of circuit by a switch ganged with a variable resistor which is controlled in accordance with a desired film speed so that at the same time as the decision voltage is changed in accordance with the film speed, the capacitance of the integrating capacitor is also changed to supress the range through which the decision voltage is varied.

However, in the exposure control circuit described, both the variable resistor and the switch must be disposed on a common substrate in order to permit them to be ganged, thus resulting in a complex arrangement and increased cost.

On the other hand, where a switch is connected in series with an integrating capacitor, the off resistance of the switch when it is turned off may cause a leakage of current to flow through the integrating capacitor. To solve this problem, there has been proposed an integrating circuit (see Japanese Laid-Open Patent Application No. 75,439/1976) in which the opposite ends of the integrating capacitor is connected across both input terminals of an operational amplifier to which the photoelectric transducer element is connected so that the capacitor remains substantially zero biased when the switch is off. However, in this integrating circuit, a series combination of the integrating capacitor and the switch, shunted by another negative feedback element, is connected in the negative feedback loop across the output terminal and the inverting input terminal of the operational amplifier, with the junction between the integrating capacitor and the switch being connected to the non-inverting input terminal of the amplifier through a positive feedback resistor, thus requiring a negative feedback element having a very high impedance. Thus, the upper limit of the integrated voltage is determined by the negative feedback element, and in order to assure a degree of dynamic range for the integrated voltage, it is necessary to choose a very high impedance for the negative feedback element when the photocurrent is extremely low. It will be realized however that it is very difficult to provide an element of such a high impedance in a stable manner for practical purpose.

SUMMARY OF THE INVENTION

In view of the foregoing, it is an object of the invention to provide an exposure control circuit for camera a in which a decision voltage which depends on film speed information is switched in terms of a constant current bias in a current mirror circuit, for a low and a high film speed in interlocked relationship with a switching of the capacitance of an integrating capacitor.

It is another object of the invention to provide an exposure control circuit for a camera in which electronic switches automatically switch both the capacitance of an integrating capacitor and a decision voltage which depends on film speed information above or below a given value which corresponds to a particular value of film speed.

It is a further object of the invention to provide an exposure control circuit for a camera which avoids the use of a negative feedback element having a high impedance and which utilizes a plurality of integrating capacitors, one of which is connected across both input terminals of an operational amplifier so as to be reset to a zero bias whenever a switch connected in series with said one integrating capacitor is turned off.

In accordance with the invention, the capacitance of the integrating capacitor and the decision voltage which depends on film speed information are simultaneously switched, whereby an exposure control can be performed over an extensive range of film speed without permitting a large variation in the decision voltage. This avoids any influence of noises or drift voltage, enabling an accurate determination of an exposure period.

According to another aspect of the invention, an operation of a variable resistor alone which is adjusted in accordance with film speed is all that is required to switch both the capacitance of the integrating circuit and the decision voltage which depends on film speed in an automatic manner at a predetermined, substantially median point in the range of film speeds, thereby greatly facilitating the operation. In addition, it is unnecessary to provide any mechanical switch which is ganged with the variable resistor, and the combination of a decision circuit and an electronic switch achieves all processings in a fully electronic manner, thus providing an increased reliability and resulting in a reduced cost.

According to a further aspect of the invention, the use of a negative feedback element having a high impedance is avoided. Instead, a plurality of integrating capacitors are used which are selectively connected into circuit, thus permitting a stable integrated output to be obtained. In addition, the dynamic range of the integrating operation is extended and the arrangement is simplified.

BRIEF DESCRIPTION OF THE DRAWINGS

FIGS. 2(A) and (B) graphically show the integrating response of the exposure control circuit shown in FIG. 1 for a low and a high film speed;

DETAILED DESCRIPTION OF PREFERRED EMBODIMENTS

Figure 1:
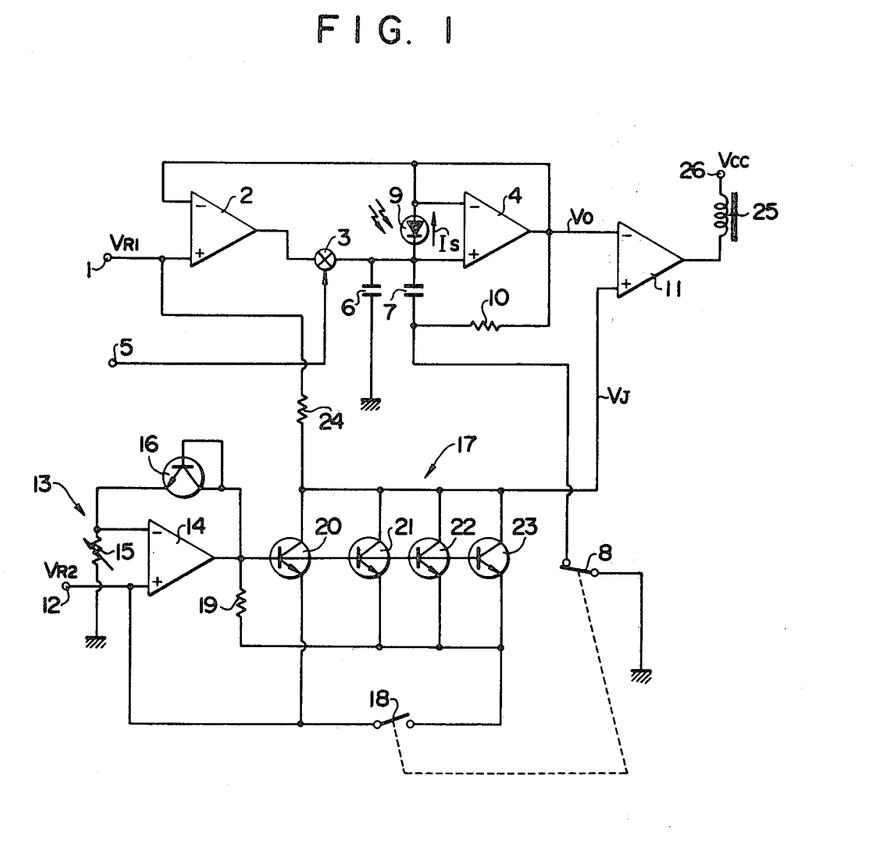
FIG. 1 is a circuit diagram of an exposure control circuit according to one embodiment of the invention.

FIG. 1 is a circuit diagram of an exposure control circuit for camera according to one embodiment of the invention. A first reference voltage $V_{R1}$ is applied to a terminal 1, which is connected to the non-inverting input terminal of an operational amplifier 2. The output terminal of the amplifier 2 is connected through an electronic switch 3 (hereafter referred to as an analog switch), which may be formed by a semiconductor switch, for example, to the non-inverting input terminal of another operational amplifier 4. The analog switch 3 has a control terminal connected to a terminal 5, to which a trigger signal is applied. A first integrating capacitor 6 is connected between the non-inverting input terminal of the amplifier 4 and the ground, and a second integrating capacitor 7 is connected in series with a changeover switch 8 in shunt relationship with the capacitor 6. For purpose of photometry, a photoelectric transducer element 9 such as photodiode or the like is adapted to receive light reflected from a first shutter blind surface and a film surface, and has its anode and cathode connected to the inverting and the non-inverting input terminal of the operational amplifier 4. The output terminal of the amplifier 4 is connected to the inverting input terminal thereof and to the inverting input terminal of the amplifier 2, and is also connected through resistor 10 to the junction between the integrating capacitor 7 and the changeover switch 8. The output terminal of the amplifier 4 is also connected to the inverting input terminal of a further operational amplifier 11, which forms an exposure decision circuit determining an exposure period.

A second reference voltage $V_{R2}$ is applied to a terminal 12, which is connected to the non-inverting input terminal of an operational amplifier 14 which forms part of film speed information presetting circuit 13. It is to be noted that the magnitude of the reference voltage $V_{R1}$ is greater than that of $V_{R2}$. The inverting input terminal of the amplifier 14 is connected to the ground through a variable resistor 15 which is adjusted to exhibit a resistance corresponding to a particular film speed. For purpose of logarithmic compression, an NPN transistor 16 has its emitter connected to the inverting input terminal of the amplifier 14 and its base and collector connected together and connected to the output terminal of the amplifier. The output terminal of the amplifier 14 is connected to the base of a plurality of transistors 20 to 23, all contained in a decision voltage circuit 17, in common, and also connected through resistor 19 to the emitter of transistors 21, 22 and 23 in common. A changeover switch 18, which is ganged with the changeover switch 8, is connected between the emitter of the transistor 20 and the emitter of the transistors 21 to 23. The junction between the emitter of transistor 20 and the changeover switch 18 is connected to the terminal 12. The changeover switch 18 is open to disconnect the emitter of the transistors 21 to 23 from the terminal 12 whenever the changeover switch 8 is closed as shown to connect the junction between the second integrating capacitor 7 and resistor 10 with the ground. Conversely, the switch 18 is closed to connect the emitter of the transistors 21 to 23 to the terminal 12 whenever the changeover switch 8 is opened.

The collectors of the transistors 20 to 23 in the decision voltage circuit 17 are connected together and connected to the non-inverting input terminal of the amplifier 11 in common, and is also connected to the terminal 1 through a resistor 24. It will be seen that the decision voltage circuit 17 is formed as a current mirror circuit formed by the transistors 20 to 23 connected in the manner mentioned above. The output terminal of the amplifier 11, which forms the exposure decision circuit, is connected through an electromagnet 25, operating to constrain a second shutter blind from running, to a terminal 26, to which a supply voltage Vcc is applied.

In operation, the resistance of the variable resistor 15 is initially adjusted by means of film speed presetting member, not shown. It is to be understood that this resistance changes in a geometrical series in accordance with the film speed. It is also to be noted that the changeover switches 8, 18 are either opened or closed as the variable resistor 15 is adjusted, depending on whether the particular magnitude of the film speed is above or below a given value. Specifically, assuming that the variable resistor 15 is variable to preset a film speed from ASA 12 to 6400, the changeover switch 8 is closed and the changeover switch 18 is opened as shown for a film speed less than ASA 250 while the changeover switch 8 is opened and the changeover switch 18 is closed for a film speed above ASA 250. In this manner, these switches are operated in ganged relationship.

When a power switch, not shown, of the camera is turned on, the reference voltages $V_{R1}$, $V_{R2}$ are applied to the terminals 1, 12, respectively. The supply voltage Vcc is applied to the terminal 26. The trigger signal applied to the terminal 5 assumes a high level or "H" level, whereby the analog switch 3 is closed. At this time, the output of the amplifier 11 assumes a low level or "L" level, whereby the electromagnet 25 is energized, allowing a second shutter blind which has previously been charged concurrently with a film winding operation to be maintained charged.

As the power switch is turned on, the variable resistor 15 is biased by the reference voltage $V_{R2}$, whereby a current $V_{R2}/R_{ASA}$ flows therethrough, representing the resistance of the variable resistor 15 by $R_{ASA}$. Accordingly, there is developed at the output terminal of the amplifier 14 a logarithmically compressed voltage $V_1=(kT/q) \ln (V_{R2}/R_{ASA})$, where k represents Boltzmann constant, T absolute temperature and q the charge of an electron. The voltage $V_1$ is applied to the base of the transistors 20 to 23 and also to the emitter of the transistors 21 to 23 through resistor 19.

Assuming now that a low film speed is preset which is less than ASA 250, a first switched condition is established in which the switch 8 is closed and the switch 18 is opened, as shown. Since the open condition of the switch 18 turns the transistors 21 to 23 off, only the transistor 20 is turned on to provide a logarithmic expansion of the output from the amplifier 14. Thus, there flows a current equal to $V_{R2}/R_{ASA}$ to the collector of the transistor 20. Accordingly, representing the resistance of resistor 24 by $R_{24}$, the collector voltage $V_J$ of the transistor 20 is represented as follows:

$$V_J = V_{R1} - (R_{24}/R_{ASA})V_{R2} \quad (1)$$

The voltage $V_J$ defined by the equation (1) is applied to the non-inverting input terminal of the amplifier 11 as a decision voltage. Since the switch 8 is closed, the junction between the integrating capacitor 7 and resistor 10 is connected to the ground. Since the trigger signal applied to the terminal 5 remains at its "H" level to permit the analog switch 3 to remain closed after the power switch is turned on, the first reference voltage $V_{R1}$ applied to the terminal 1 is applied to the non-inverting input terminal of the amplifier 4 through the amplifier 2 and the analog switch 3, and hence both the first and the second integrating capacitor 6, 7 are charged by the reference voltage $V_{R1}$.

Figure 2:
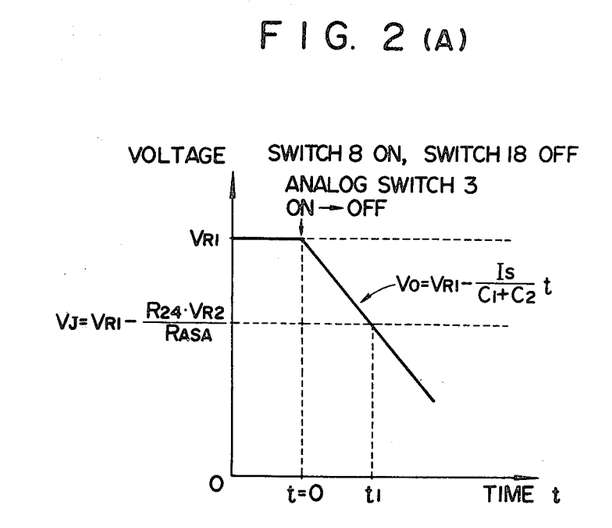

If a shutter release button is now depressed, the movable mirror associated with the finder view moves upward, whereby light reflected from the surface of the first shutter blind as well as from a film surface which becomes exposed as the first blind runs impinges upon the transducer element 9, producing a photocurrent $I_S$. Simultaneously, the trigger signal applied to the terminal 5 changes to its "L" level, whereby the analog switch 3 is turned off. The amplifier 4 has a high input impedance, and subsequently the charge stored across the integrating capacitors 6, 7 discharges through the amplifier 4 in accordance with the photocurrent $I_S$ from the transducer element 9. A photometric output—the output voltage $V_O$ of the amplifier 4—when the photocurrent $I_S$ has flowed for a time interval t, may be expressed as follows:

$$V_O = V_{R1} - I_S/(C_1+C_2)t \quad (2)$$

where $C_1$ and $C_2$ represent the capacitance of the first and the second integrating capacitor 6, 7. Such output voltage $V_O$ is graphically shown by solid line in FIG. 2(A). It is to be understood that the capacitances $C_1$, $C_2$ are chosen so that $C_1 : (C_1+C_2) = 1:4$ so as to correspond to the switching of the level of the decision voltage $V_J$ as will be further described later.

When the voltage $V_O$ defined by the equation (2) is applied to the amplifier 11, it is compared against the decision voltage $V_J$ defined by the equation (1) and which is shown by broken lines in FIG. 2(A). As long as $V_O > V_J$, the output from the amplifier 11 assumes its "L" level, whereby the electromagnet 25 is maintained energized, constraining the second shutter blind from running. However, at $t=t_1$ when $V_O=V_J$, the output of the amplifier 11 changes to its "H" level, whereby the electromagnet 25 is deenergized to allow the second shutter blind to run, thus terminating an exposure. It is to be understood that the decision voltage $V_J$ defined by the equation (1) under the first switched condition of the switches 8, 18 (namely, switch 8 on and switch 18 off) has its level varying up and down in FIG. 2(A) in accordance with a selected value of film speed in a range from ASA 12 to 250, thus allowing an exposure control in accordance with the particular value of film speed.

When a film speed higher than ASA 250 is chosen, a second switched condition is established in which the switch 8 is opened and the switch 18 is closed. The output voltage $V_1$ from the amplifier 14 is now applied to the bases of the transistors 20 to 23, whereby a current of magnitude $V_{R2}/R_{ASA}$ flows through the collector of each transistor. The common collector voltage of these transistors, which is utilized as the decision voltage $V_J$, is expressed as follows:

$$V_J = V_{R1} - (4R_{24}/R_{ASA})V_{R2} \quad (3)$$

Because the switch 8 is open, the junction between the second integrating capacitor 7 and resistor 10 is not connected to the ground, so that only the first integrating capacitor 6 is charged by the first reference voltage $V_{R1}$. As a result of opening of the changeover switch 8, the junction between the integrating capacitor 7 and resistor 10 is connected through the resistor 10 to the inverting input terminal of the amplifier 4, so that the opposite ends of the integrating capacitor 7 is connected across the both input terminals of the amplifier 4 to provide a zero bias thereacross. In other words, the capacitor 7 is reset.

When a shutter release button is now depressed to cause an upward movement of the movable mirror and to allow the first shutter blind to run, the transducer element 9 produces the photocurrent $I_S$ to begin an integrating operation as a result of the analog switch 3 being turned off. Since only the first integrating capacitor 6 is now charged, the charge stored across the capacitor 6 discharges in accordance with the photocurrent $I_S$ from the transducer element 9. Accordingly, the output voltage $V_O$ from the amplifier 4 is expressed as follows:

$$V_O = V_{R1} - (I_S/C_1)t \quad (4)$$

Such output voltage is graphically shown by solid line in FIG. 2(B). The comparison of the voltage $V_O$ defined by the equation (4) with the voltage $V_O$ defined by the equation (2) will show that the voltage $V_O$ defined by the equation (4) undergoes a more rapid change. In other words, for a high film speed, the capacitance of the integrating circuit is reduced to permit the output voltage $V_O$ to change more rapidly. It will be evident from the equation (3) that a voltage drop across the resistor 24 is now increased to reduce the magnitude of the decision voltage $V_J$. When the voltage $V_J$ defined by the equation (4) is applied to the amplifier 11, it is compared against the decision voltage $V_J$ defined by the equation (3) and shown by broken lines in FIG. 2(B). At time $t=t_2$ when $V_O=V_J$, the output from the amplifier 11 changes from its "L" level to its "H" level, whereby the electromagnet 25 is deenergized, allowing the second shutter blind to run to thereby terminate an exposure. It will also be noted that the decision voltage $V_J$ defined by the equation (3) under the second switched condition of the switches 8, 18 (namely, switch 8 off and switch 18 on) has its level varying up and down in FIG. 2(B) in accordance with a change in the film speed in a range from ASA 250 to 6400, thus allowing an exposure control in accordance with the film speed.

In the embodiment described above, it will be seen that the decision voltage which depends on the film speed and the capacitance of the integrating circuit are simultaneously switched by means of the changeover switches 8, 18 which are either opened or closed oppositely above or below a film speed that is chosen to be substantially a median value in the range of selectable values of film speeds. As a consequence, the decision voltage $V_J$ is varied within a reduced range, as a film speed is changed between its maximum and minimum value, as compared with an arrangement in which the integrating capacitance remains constant. In this manner, an accurate exposure control free from the influences of noises and drift is assured.

Figure 3:
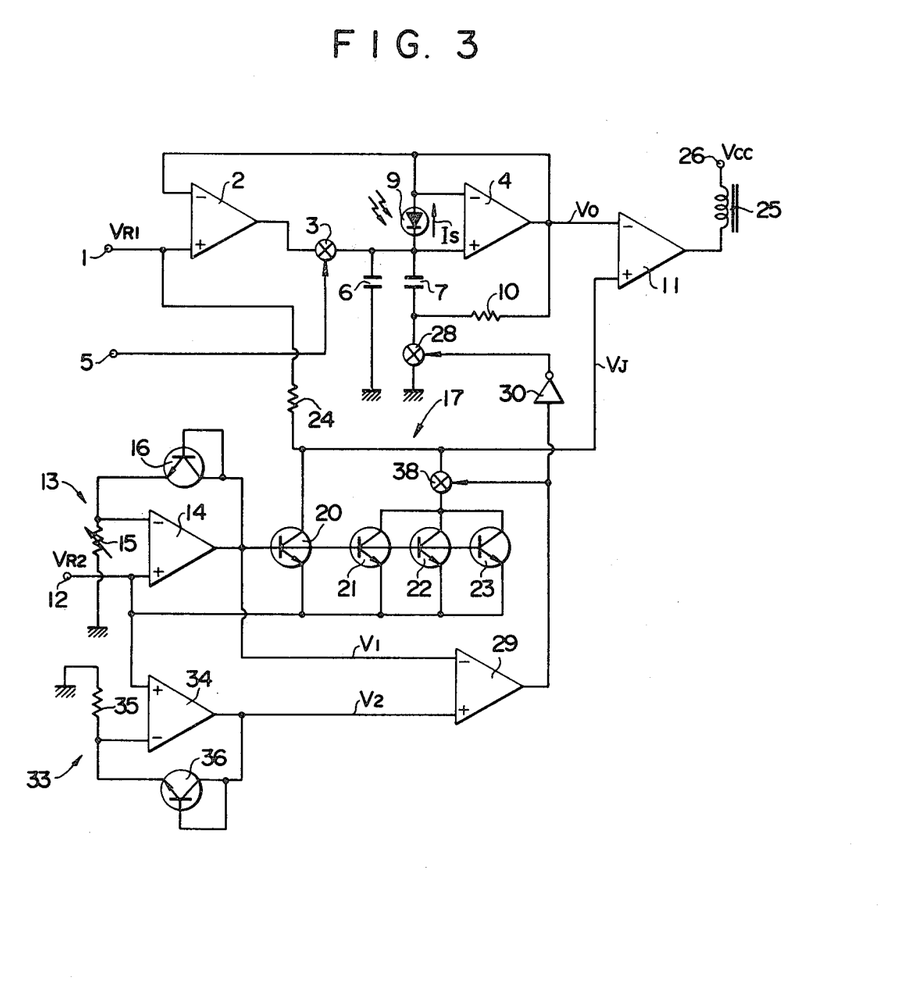
FIG. 3 is a circuit diagram of an exposure control circuit according to another embodiment of the invention.

FIG. 3 is a circuit diagram of an exposure control circuit for camera according to another embodiment of the invention. Components which are identical to those shown in the exposure control circuit of FIG. 1 are designated by like reference characters in FIG. 3, and their description will not be repeated. In the exposure control circuit of FIG. 3, the changeover switches 8, 18 are replaced by analog switches 28, 38. Specifically, the junction between the integrating capacitor 7 and resistor 10 is connected to the ground through the analog switch 28, and the analog switch 38 is connected between the non-inverting input terminal of the amplifier 11 and the commoned collectors of the transistors 21 to 23. The analog switch 38 has a control terminal which is connected to the output terminal of an operational amplifier 29, which forms a comparison circuit. The control terminal of the analog switch 28 is connected to the output of an inverter 30 which is in turn connected to the output terminal of the amplifier 29.

In addition to the film speed information presetting circuit 13 which permits any particular film speed to be established by means of the variable resistor 15, there is provided a second film speed information presetting circuit 33. As before, the reference voltage $V_{R2}$ is applied to the terminal 12, which is in turn connected to the non-inverting input terminal of the amplifier 14 in the first film speed information presetting circuit 13. Similarly, the terminal 12 is connected to the emitters of the transistors 20 to 23 in the decision voltage circuit 17 in common, and is also connected to the non-inverting input terminal of an operational amplifier 34 in the second film speed information presetting circuit 33. The amplifier 34 has an inverting input terminal which is connected to the ground through a resistor 35 having a resistance which corresponds to a particular value of film speed. For purpose of logarithmic compression, an NPN transistor 36 is connected across the inverting input terminal and the output terminal of the amplifier 34, generally in the similar manner as the transistor 16 in the first presetting circuit 13. The output terminal of the amplifier 14 is connected to the inverting input terminal of the operational amplifier 29, which forms a comparison circuit, while the output terminal of the amplifier 34 is connected to the non-inverting input terminal of the amplifier 29.

In operation, as the power switch of the camera is turned on, the variable resistor 15 in the first film speed information presetting circuit 13 is biased by the reference voltage $V_{R2}$, whereby there is developed at the output terminal of the amplifier 14 a voltage $V_1 = (kT/q) \ln (V_{R2}/R_{ASA})$. Similarly, in the second circuit 33, a current of a magnitude $V_{R2}/R_{35}$ (where $R_{35}$ represents the resistance of the resistor 35) flows through this resistor, whereby there is developed at the output terminal of the amplifier 34 a logarithmically compressed voltage $V_2 = (kT/q) \ln (V_{R2}/R_{35})$.

It is to be understood that the resistance $R_{35}$ of the resistor 35 in the second film speed information presetting circuit 33 is chosen so as to correspond to a film speed which represents a substantially median value of the range of film speed which can be established by the variable resistor 15. By way of example, assuming that the variable resistor 15 permits a film speed to be selected which ranges from ASA 12 to 6400, the resistance $R_{35}$ is chosen so as to correspond to a film speed on the order of ASA 250. As mentioned previously, as the resistance $R_{ASA}$ of the variable resistor 15 is changed, the resulting film speed varies in a geometrical series of 12, 25, 50, 100 . . . . Accordingly, the film speed information established by the variable resistor 15 is fed through the amplifier 14 to the base of the transistors 20 to 23 and to the inverting input terminal of the amplifier 29 in the form of the voltage $V_1$. The output voltage $V_2$ from the amplifier 34 is applied to the non-inverting input terminal of the amplifier 29, but it should be understood that the voltage $V_2$ is constant which corresponds to a particular film speed, for example, ASA 250, which is established by the resistor 35. The both voltages $V_1$ and $V_2$ are compared against each other by the amplifier 29 to determine their relative level. Assuming that the variable resistor 15 is adjusted to establish a film speed which is lower than the film speed of ASA 250 established by the resistor 35 (namely, $R_{ASA} < R_{35}$), it follows that $V_1 > V_2$, and the output of the amplifier 29 assumes an "L" level. Conversely, for $R_{ASA} > R_{35}$, it follows that $V_1 < V_2$, and hence the output from the amplifier 29 assumes its "H" level.

For a film speed established by the variable resistor 15 which is less than that established by the resistor 35, the amplifier 29 outputs an "L" output, whereby the analog switch 38 is turned off while the analog switch 28 is turned on. Since the analog switch 38 is turned off, the output voltage $V_1$ from the amplifier 14 which is applied to the base of the transistors 20 to 23 cannot make transistors 21 to 23 conductive, but only the transistor 20 conducts, allowing a current flow of $V_{R2}/R_{ASA}$ to the collector thereof. Accordingly, there is developed at the collector of the transistor 20 a voltage $V_J = V_{R1} - (R_{24}/R_{ASA})V_{R2}$ defined by the equation (1). This voltage $V_J$ is applied to the non-inverting input terminal of the amplifier 11 as a decision voltage. Since the analog switch 28 is turned on, the junction between the integrating capacitor 7 and resistor 10 is connected to the ground. Since the trigger signal applied to the terminal 5 remains at its "H" level as the power switch is turned on and the analog switch 3 is turned on, the first reference voltage $V_{R1}$ applied to the terminal 1 is fed through the amplifier 2 and the analog switch 3 to be applied to the non-inverting input terminal of the amplifier 4. Accordingly, both the first and the second integrating capacitor 6, 7 are charged by the reference voltage $V_{R1}$.

If a shutter release button is now depressed, the movable mirror associated with the finder moves upward to allow the incidence upon the transducer element 9 of light which is reflected from the first shutter blind surface as well as from the film surface as the first blind begins to run, producing a photocurrent $I_S$. At this time, the trigger signal applied to the terminal 5 changes to its "L" level, thus turning the analog switch 3 off. Thereupon, the charge stored across the integrating capacitors 6, 7 discharges through the amplifier 4 in accordance with the photocurrent $I_S$ flowing through the transducer element 9. As a result, there is developed at the output terminal of the amplifier 4 a voltage $V_o = V_{R1} - I_S/(C_1+C_2)t$, as defined by the equation (2).

Figure 4A:
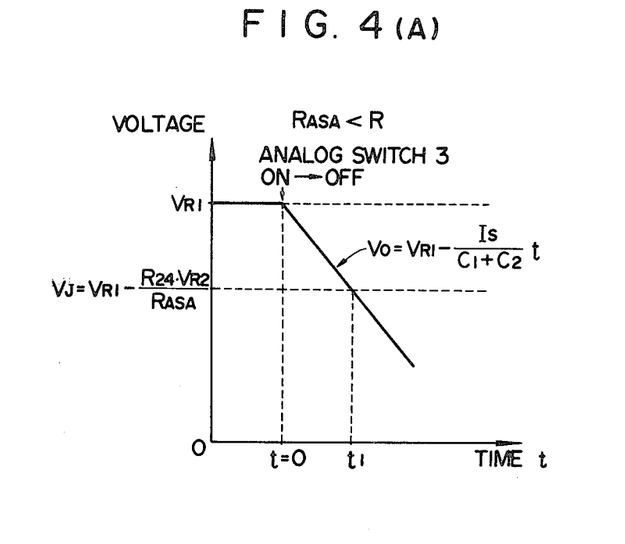
FIGS. 4(A) and (B) graphically show the integrating response of the circuit shown in FIG. 3 for a low and a high film speed.

The voltage $V_O$ is applied to the amplifier 11 and is compared against the decision voltage $V_J$ defined by the equation (1) which is shown by broken lines in FIG. 4(A). For $V_O > V_J$, the output of the amplifier 11 remains at its "L" level, maintaining the electromagnet 25 energized to constrain the second shutter blind from running. At time $t = t_1$ when $V_O = V_J$, the output of the amplifier 11 changes to its "H" level, deenergizing the electromagnet 25 to allow the second blind to run, thus terminating an exposure.

For a film speed established by the variable resistor 15 which is higher than that established by the resistor 35, it follows that $R_{ASA} > R_{35}$, and the output from the amplifier 29 assumes its "H" level. Hence, the analog switch 38 is turned on while the analog switch 28 is turned off. Accordingly, when the output voltage $V_1$ from the amplifier 14 is applied to the base of the transistors 20 to 23, there occurs a current flow of $V_{R2}/R_{ASA}$ to the collector of the respective transistors 20 to 23. Accordingly, the common collector voltage of these transistors 20 to 23 or the decision voltage $V_J$ applied to the amplifier 11 is $V_J = V_{R1} - (4R_{24}/R_{ASA})V_{R2}$, as defined by the equation (3). Since the analog switch 28 is turned off, the junction between the second integrating capacitor 7 and resistor 10 is not connected to the ground, and hence only the first integrating capacitor 6 is charged by the reference voltage $V_{R1}$. Since the terminal of the integrating capacitor 7 which is connected to the ground when the analog switch 28 is turned on is now connected to the inverting input terminal of the amplifier 4 through resistor 10 as the switch 28 is turned off, it follows that the opposite ends of the integrating capacitor 7 is connected across the both input terminals of the amplifier 4 and thus is subject to a zero bias. In other words, the capacitor 7 is reset.

Figure 4B:
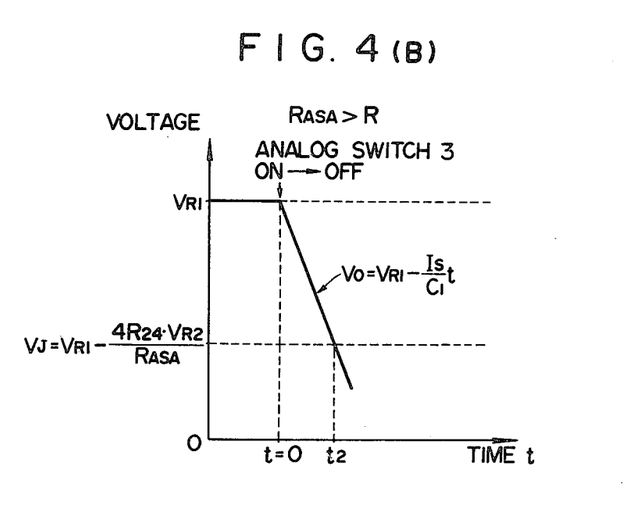

If a shutter release button is now depressed to cause the movable mirror to move upward, allowing the first shutter blind to run, photocurrent $I_S$ passes through the transducer element 9, and the analog switch 3 is changed from its on to its off condition, thus initiating an integrating operation. Since only the first integrating capacitor 6 is charged at this time, the charge stored thereacross discharges in accordance with the photocurrent $I_S$. Accordingly, the output voltage $V_O$ from the amplifier 4 is defined by the equation (4), or $V_O = V_{R1} - (I_S/C_1)t$. The voltage $V_O$ is applied to the amplifier 11 and is compared against the decision voltage $V_J$ defined by the equation (3) which is shown by broken lines in FIG. 4(B). At time $t = t_2$ when $V_O = V_J$, the output from the amplifier 11 changes from its "L" to its "H" level, whereby the electromagnet 25 is deenergized to allow the second shutter blind to run, thus terminating an exposure. It is to be noted that for each instance of $R_{ASA} < R_{35}$ and $R_{ASA} > R_{35}$, the level of the decision voltage $V_J$ varies up and down in FIGS. 4(A) and (B) in accordance with an established film speed in order to permit an exposure control in accordance with the film speed.

In this manner, with the exposure control circuit shown in FIG. 3, both the decision voltage which depends on the magnitude of the film speed and the capacitance of the integrating circuit are automatically and simultaneously switched above or below a resistance of the variable resistor 15 which is equal to the resistance $R_{35}$ of the resistor 35 corresponding to a particular value of film speed. Thus, the decision voltage $V_J$ can again be allowed to vary within a reduced range in this exposure control circuit as the film speed is changed between its maximum and its minimum value. This means that an accurate exposure control is achieved which is free from the influences of noises or drift. In this embodiment, the switching of the decision voltage and the capacitance is automatically performed by means of the analog switches, thus facilitating its operation and increasing the reliability.

What is claimed is:

1. An exposure control circuit for a camera, comprising:
   a photoelectric transducer element for photometry which produces a photocurrent in accordance with the magnitude of the brightness of an object being photographed;
   an integrating circuit including a plurality of integrating capacitors for integrating the photocurrent produced by the transducer element;
   an operational amplifier for photometry which delivers a photometric output in the form of an integrated voltage of the integrating circuit;
   a film speed information presetting circuit for developing a film speed information voltage which corresponds to the film speed of a film being used;
   a decision voltage circuit for converting an output voltage from the film speed information presetting circuit into a decision voltage, said decision voltage circuit comprising a current mirror circuit including a plurality of transistors, the changeover switch means including a changeover switch to which the mirror circuit is connected, the changeover switch causing the current mirror circuit to generate the decision voltage by amplifying the film speed information voltage by a first amount when the changeover switch is in a first position and causing the current mirror circuit to generate the decision voltage by amplifying the film speed information voltage by a second amount different than the first amount, when the changeover switch is in the second position;
   an exposure decision circuit for comparing the photometric output from the operational amplifier against the decision voltage from the decision voltage circuit to control an exposure period;
   and changeover switch means connected in both the integrating circuit and the decision voltage circuit for concurrently switching the effective capacitance of the integrating circuit and the decision voltage of the decision voltage circuit.

2. An exposure control circuit according to claim 1, wherein the changeover switch is a first changeover switch, the operational amplifier for photometry has its output terminal connected to its inverting input terminal, and the transducer element is connected across both input terminals of the operational amplifier, the plurality of integrating capacitors includes first and second capacitors each having first and second ends, their first end connected to the non-inverting input terminal of the operational amplifier, the first integrating capacitor having its second end connected to the output terminal of the operational amplifier, the changeover switch means further including a second changeover switch through which the second end of the second integrating capacitor is connected to the second end of the first integrating capacitor.

3. An exposure control circuit for a camera, comprising:

a photoelectric transducer element for photometry which produces a photocurrent in accordance with the magnitude of the brightness of an object being photographed;

an integrating circuit including a plurality of integrating capacitors for integrating a photocurrent produced by the transducer element;

an operational amplifier for photometry which delivers a photometric output in the form of the integrated voltage of the integrating circuit;

a first film speed information presetting circuit for producing a film speed information voltage which is arbitrarily preset in accordance with the film speed of a film being used;

a second film speed information presetting circuit for producing a film speed information voltage of a given value corresponding to a predetermined value of film speed;

a decision voltage circuit for converting an output voltage from the first film speed information presetting circuit into a decision voltage;

an exposure decision circuit for comparing the photometric output from the operational amplifier against the decision voltage from the decision voltage circuit to control an exposure period;

electronic switch means connected in both the integrating circuit and the decision voltage circuit for simultaneously switching the effective capacitance of the integrating circuit and the decision voltage of the decision voltage circuit;

and a comparison and decision circuit for comparing the output voltages from the first and the second film speed information presetting circuits against each other to produce output voltages of opposite polarities which are effective to turn the electronic switch means on or off.

4. An exposure control circuit according to claim 3 in which the operational amplifier for photometry has its output terminal connected to the inverting input terminal and wherein the transducer element is connected across both input terminals of the operational amplifier, the plurality of integrating capacitors including a first and a second integrating capacitor each of which has first and second ends, the first end of each of said first and second capacitors being connected to the non-inverting input terminal of the operational amplifier, the first integrating capacitor having its second end connected to the output terminal of the operational amplifier, the electronic switch means including a first electronic switch through which the second end of said first integrating capacitor is connected to the second end of the second integrating capacitor.

5. An exposure control circuit according to claim 3 in which the decision voltage circuit is formed by a current mirror circuit including a plurality of transistors, the electronic switch means including a second electronic switch to which the current mirror circuit is connected.

* * * * *